United States Patent
Matsubara

(10) Patent No.: US 8,581,857 B2
(45) Date of Patent: Nov. 12, 2013

(54) POSITION DETECTING DEVICE AND POSITION DETECTING METHOD

(75) Inventor: Masaki Matsubara, Meguro-ku (JP)

(73) Assignee: Wacom Co., Ltd., Saitama (JP)

( * ) Notice: Subject to any disclaimer, the term of this patent is extended or adjusted under 35 U.S.C. 154(b) by 379 days.

(21) Appl. No.: 12/534,062

(22) Filed: Jul. 31, 2009

(65) Prior Publication Data

US 2010/0289758 A1  Nov. 18, 2010

(30) Foreign Application Priority Data

Aug. 6, 2008  (JP) ................................ 2008-203325

(51) Int. Cl.
*G06F 3/041* (2006.01)

(52) U.S. Cl.
USPC ............................. 345/173; 345/156; 345/174

(58) Field of Classification Search
USPC ......................... 345/173–178, 204, 211–214
See application file for complete search history.

(56) References Cited

U.S. PATENT DOCUMENTS

| | | | |
|---|---|---|---|
| 3,818,133 A | 6/1974 | Cotter | |
| 4,686,332 A * | 8/1987 | Greanias et al. | 345/173 |
| 5,581,274 A * | 12/1996 | Tagawa | 345/104 |
| 5,606,346 A | 2/1997 | Kai et al. | |
| 6,088,024 A * | 7/2000 | Yamagata | 345/173 |
| 6,091,030 A | 7/2000 | Tagawa et al. | |
| 6,259,437 B1 | 7/2001 | Onodaka et al. | |
| 6,373,474 B1 * | 4/2002 | Katabami | 345/173 |
| 8,274,481 B2 * | 9/2012 | Nishimura et al. | 345/173 |
| 8,279,187 B2 * | 10/2012 | Geaghan | 345/173 |
| 8,405,633 B2 * | 3/2013 | Geaghan | 345/173 |
| 8,451,234 B2 * | 5/2013 | Sato et al. | 345/173 |
| 2002/0011991 A1 * | 1/2002 | Iwasaki et al. | 345/173 |
| 2002/0171635 A1 * | 11/2002 | Takahashi et al. | 345/177 |
| 2004/0003949 A1 | 1/2004 | Lin | |
| 2007/0262966 A1 * | 11/2007 | Nishimura et al. | 345/173 |
| 2008/0048997 A1 * | 2/2008 | Gillespie et al. | 345/174 |
| 2008/0158167 A1 | 7/2008 | Hotelling et al. | |
| 2010/0321333 A1 * | 12/2010 | Oda et al. | 345/174 |
| 2010/0321334 A1 * | 12/2010 | Oda et al. | 345/174 |

FOREIGN PATENT DOCUMENTS

| | | |
|---|---|---|
| FR | 2709576 A1 | 3/1995 |
| JP | 07-253851 A | 10/1995 |
| JP | 09292950 A | 11/1997 |
| JP | 10-20992 A | 1/1998 |
| JP | 10-020992 A | 1/1998 |

OTHER PUBLICATIONS

Extended European Search Report dated Sep. 27, 2012, for corresponding EP Application No. 09010187.4, 6 pages.

* cited by examiner

*Primary Examiner* — Christopher E Leiby

(74) *Attorney, Agent, or Firm* — Seed IP Law Group PLLC

(57) ABSTRACT

An electrostatic capacity type position detecting device having increased scanning speed is provided. The device includes a signal supplying electrode including a plurality of electrodes arranged in parallel with each other in a first direction, and a receiving electrode also including a plurality of electrodes arranged in parallel with each other in a second direction perpendicular to the first direction. A one-shot pulse having a predetermined time width is applied sequentially to the plurality of electrodes of the signal supplying electrode at a frequency equal to an integral multiple of 200 kHz. In other words, the sequential application of the one-shot pulse occurs with a time difference that is shorter than (e.g., 1/N of) the predetermined time width. A current change caused at rising and falling edges of the one-shot pulse is detected through the receiving electrode, to thereby indicate a position on the position detecting device.

14 Claims, 6 Drawing Sheets

POSITION DETECTING DEVICE AND POSITION DETECTING METHOD

CROSS REFERENCES TO RELATED APPLICATIONS

The present invention claims priority under 35 U.S.C. §119 from Japanese Patent Application JP 2008-203325, filed in the Japanese Patent Office on Aug. 6, 2008, the entire contents of which being incorporated herein by reference.

BACKGROUND OF THE INVENTION

1. Field of the Invention

The present invention relates to a technique preferably applied to a position detecting device.

More particularly, the present invention relates to a technique for improving the scanning speed of an electrostatic capacity type position detecting device.

2. Description of the Related Art

There are various kinds of input devices for providing position information to a computer. Such input devices include a kind of two-dimensional position information input device called "touch panel".

The touch panel is an input device for operating a computer and the like by a user touching a flat detection surface thereof with an input tool such as a finger, a dedicated stylus pen, and the like. In the touch panel, the position touched by the finger or the dedicated stylus pen is detected, the detected position is indicated in the screen, and an instruction is outputted to the computer.

The touch panel is widely used in a PDA (Personal Digital Assistant), ATM (Automated Teller Machine) of a bank, railway ticket-vending machine, and the like.

Various kinds of positional information detection technologies can be applied to the aforesaid touch panel. For example, there are a resistance film type position detecting device which detects the position based on a pressure change, an electrostatic capacity type position detecting device which detects the position based on a capacitance change of a film on the flat position detection surface, and the like.

An electrostatic capacity type position detecting device will be described below with reference to FIG. 6.

The position detecting device shown in FIG. 6 includes a driving section 602, a transmission selection switch 603, a reception selection switch 104, a matrix electrode 103, a preamplifier 109, an A/D converter 105, a position calculating section 106, and a synchronous clock generating section 606.

The driving section 602 generates an AC voltage having a frequency of 200 kHz, which is the frequency most easily to be absorbed by human body. The AC voltage of 200 kHz generated by the driving section 602 is selectively applied, through the transmission selection switch 603, to electrodes arranged in an X-axis direction (referred to as the "X-axis electrode group" hereinafter) 107 of the matrix electrode 103.

The matrix electrode 103 is formed by a plurality of elongated conductive electrodes arranged lengthwise and crosswise. Each of intersections of the lengthwise arranged electrodes and crosswise arranged electrodes, interposing therebetween a substantially plate-like dielectric sheet (not shown), forms a small-capacity capacitor. The AC voltage of 200 kHz is applied to these capacitors.

The reception selection switch 104 is a switch for selecting an intersection which forms a capacitor. The output of the reception selection switch 104 is supplied to the preamplifier 109, converted to digital signal by the A/D converter 105, and then inputted to the position calculating section 106.

The position calculating section 106, which is formed by a microcomputer, determines whether there is a finger on the matrix electrode 103 and calculates position information of the finger based on address information obtained from the synchronous clock generating section 606 and data corresponding to the slight signal change obtained from the A/D converter 105. Specifically, the position calculating section 106 detects a peak value after integrating the data obtained from the A/D converter 105. Further, the position calculating section 106 performs gravity center calculation based on the peak value and values before and after the peak value, and calculates the position of the finger based on the position of the obtained gravity center on a time axis.

To facilitate the following description, in the matrix electrode 103, the electrode group connected to the transmission selection switch 603 is referred to as "X-axis electrode group 107", and the electrode group connected to the reception selection switch 104 is referred to as "Y-axis electrode group 108".

Next, the internal structure of the driving section 602 will be described below.

The driving section 602 includes a clock generator 607, a readout section 608, a sine wave ROM 609, a D/A converter 610, a LPF 611, and a driver 612. The clock generator 607 is an oscillator for generating a clock. The clock generated by the clock generator 607 is supplied to the readout section 608.

The sine wave ROM 609 has 8 bits×256 samples of pseudo sine wave data stored therein. Based on the clock supplied by the clock generator 607, the readout section 608 designates an address of the sine wave ROM 609 and reads out the data.

The data read out from the sine wave ROM 609 by the readout section 608 is D/A converted by the D/A converter 610 and smoothed by the LPF 611, to be thereby converted into an analog sine wave signal. Thereafter, the voltage of the analog sine wave signal is amplified by the driver 612 so as to become an AC voltage to be applied to the X-axis electrode group 107.

Incidentally, the prior art of the present invention is disclosed in Japanese Unexamined Patent Application Publication No. 10-020992.

SUMMARY OF THE INVENTION

In the electrostatic capacity type position detecting device according to the prior art, the integration process is performed on each of the intersections of the X-axis electrode group 107 and Y-axis electrode group 108. The time necessary for performing such an integration process is about 30 μsec for each intersection.

The time necessary for performing such an integration process will not cause serious problem if a position detecting device has a relatively small size, but it will cause obvious problems if the position detecting device is large. Specifically, if the position detecting device is large, the number of the intersections will increase. The larger the number of the intersections is, the longer time will be needed for scanning the entire flat position detection surface.

Generally, a preferred time resolution of a pointing device, such as a position detecting device, a mouse, or the like, is about 10 msec. Thus, given the constraint that each of the intersections of the position detecting device is scanned in 30 μsec, the maximum number of the intersections possible to be formed in the flat detection surface is about 333.

The applicant of the present invention aims to provide an electrostatic capacity type position detecting device having a large-sized flat position detection surface. The target number of the intersections in the flat position detection surface of the position detecting device is 15000. Accordingly, such a target number can not be achieved if the position detecting device is made using the technologies known in the prior art.

In this connection, if the position detecting device is an electromagnetic induction type position detecting device, one method for solving such a problem is to increase the scanning speed by increasing the frequency of the AC voltage applied to the flat position detection surface. However, if the position detecting device is an electrostatic capacity type position detecting device, since there is an inherent constraint that the frequency most easily to be absorbed by the human body has to be used, the frequency of the applied AC voltage can not be arbitrarily increased.

Another method is to divide the intersections into a plurality of intersection groups, and to provide a plurality of position detecting circuits to respective intersection groups. However, if a plurality of position detecting circuits are provided to respective intersection groups, not only the device will become large and expensive, but also complexity in design will be increased, which is a significant problem.

In view of the aforesaid problems, it is an object of the present invention to provide an electrostatic capacity type position detecting device and a position detecting method capable of performing high speed scanning with relatively simple circuit configuration.

To solve the aforesaid problems, according to an aspect of the present invention, a position detecting device is provided, which includes: a signal supplying electrode in which a plurality of electrodes are arranged in parallel with each other in a first direction; and a receiving electrode in which a plurality of electrodes are arranged in parallel with each other in a second direction substantially perpendicular to the first direction. According to various exemplary embodiments of the present invention, the position detecting device is an electrostatic capacity type device, wherein the plurality of electrodes in the signal supplying electrode and the plurality of electrodes in the receiving electrode form a plurality of intersections, respectively, each forming a capacitor. The position detecting device further includes a signal supplying circuit adapted to supply a signal having a predetermined time width to each of a first electrode and a second electrode of the signal supplying electrode with a time difference therebetween that is shorter than the time width. The position detecting device still further includes a position calculating section adapted to detect a change in a signal outputted from the receiving electrode and calculate a position on the position detecting device indicated by an indicator based on the detected change.

By supplying a first signal and a second signal, both having the predetermined time width, to each of a first electrode and a second electrode of the signal supplying electrode, with a specific time difference shorter than the predetermined time width, an electrostatic capacity type position detecting device having a large-sized position detection surface can be achieved without having to employ a complicated circuit to, for example, divide the detection surface.

According to the present invention, it is possible to provide an electrostatic capacity type position detecting device and a position detecting method capable of performing high speed scanning with relatively simple circuit configuration.

DETAILED DESCRIPTION OF THE PREFERRED EMBODIMENT(S)

Embodiments of the present invention will be described below with reference to FIGS. 1 to 5J.

Figure 1:
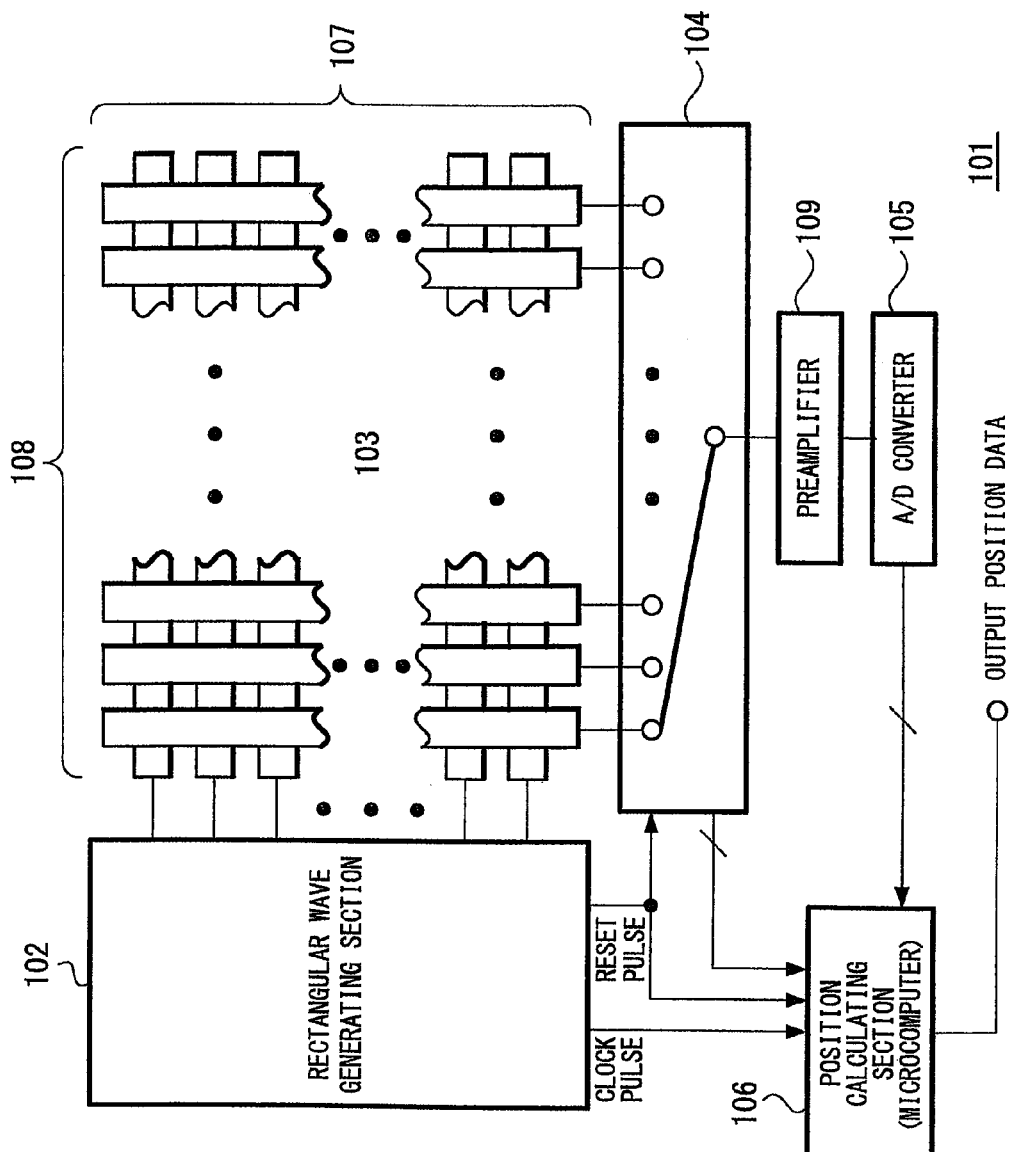
FIG. 1 is a block diagram showing an overall configuration of a position detecting device according to an embodiment of the present invention.

FIG. 1 is an entire block diagram showing a position detecting device 101 according to an embodiment of the present invention. The position detecting device 101 includes a rectangular wave generating section 102, a matrix electrode 103 connected to the rectangular wave generating section 102, a reception selection switch 104 connected to the matrix electrode 103, a preamplifier 109 connected to the reception selection switch 104, an A/D converter 105 connected to the preamplifier 109, and a position calculating section 106 connected to the A/D converter 105.

The rectangular wave generating section 102 is a signal supplying section for supplying a one-shot pulse voltage, which has a rectangular waveform, to the matrix electrode 103 (which is to be described later). In addition to the voltage of the one-shot pulse, the rectangular wave generating section 102 generates a clock pulse and a reset pulse. The clock pulse generated by the rectangular wave generating section 102 is supplied to the position calculating section 106, which is to be described later.

The reset pulse generated by the rectangular wave generating section 102 is supplied to the reception selection switch 104, which is to be described later, and the position calculating section 106.

Incidentally, the pulse width of the one-shot pulse generated by the rectangular wave generating section 102 is set to, for example, 2.5 μsec, which equals to a half period of the rectangular wave of 200 kHz (which is the frequency most easily to be absorbed by a human body).

The matrix electrode 103 is an electrode group for detecting a position indicated by a finger of a human on a position detecting flat surface (not shown) of the position detecting device 101. The matrix electrode 103 is formed by an X-axis electrode group 107 and a Y-axis electrode group 108. The X-axis electrode group 107 includes m pieces of elongated electrodes extending generally horizontally in FIG. 1 and arranged in parallel with each other. The Y-axis electrode group 108 includes n pieces of elongated electrodes extending generally vertically in FIG. 1 and arranged in parallel with each other.

The elongated electrodes of the X-axis electrode group 107 and the elongated electrodes of the Y-axis electrode group 108 of the matrix electrode 103 are arranged lengthwise and crosswise with a dielectric (e.g., insulating) sheet (not shown) interposed therebetween, so that the X-axis electrode group 107 and the Y-axis electrode group 108 are substantially insulated from each other. Thus, each of intersections of the X-axis electrode group 107 and the Y-axis electrode group 108 forms a capacitor.

The X-axis electrode group 107 is connected to the rectangular wave generating section 102, and the one-shot pulse is applied to the X-axis electrode group 107 from the rectangular wave generating section 102. Since the one-shot pulse is supplied to the capacitor formed at each of the intersections of the X-axis electrode group 107 and the Y-axis electrode group 108 through the X-axis electrode group 107, the X-axis electrode group 107 serves as a signal supplying electrode.

The reception selection switch 104 is a switch for periodically selecting one of the plurality of the electrodes of the Y-axis electrode group 108 and is connected to the Y-axis electrode group 108. The reception selection switch 104 is also connected to the rectangular wave generating section 102, the preamplifier 109, and the position calculating section 106. The reset pulse outputted from the rectangular wave generating section 102 is inputted to the reception selection switch 104.

The reception selection switch 104 outputs the current outputted from the matrix electrode 103 through the Y-axis electrode group 108 to the preamplifier 109. In other words, the Y-axis electrode group 108 is used as a signal receiving electrode.

Further, the reception selection switch 104 outputs address information, which indicates which one of the plurality of the electrodes of the Y-axis electrode group 108 has been selected, to the position calculating section 106.

The preamplifier 109 converts the very weak current outputted from the matrix electrode 103 through the reception selection switch 104 into a voltage, amplifies the voltage, and outputs the amplified voltage to the A/D converter 105.

The A/D converter 105 converts the analog signal outputted from the preamplifier 109 into a digital signal, and outputs the digital signal to the position calculating section 106.

The position calculating section 106 is a microcomputer for performing a calculation process on the address information received from the reception selection switch 104 and the digital data received from the A/D converter 105, to determine whether or not there is a finger on the matrix electrode 103 and outputting position information of the finger.

The digital data outputted from the A/D converter 105, the clock pulse outputted from the rectangular wave generating section 102, and the address information outputted from the reception selection switch 104 are inputted to the position calculating section 106.

Next, the configuration and operation of the rectangular wave generating section 102 will be described below with reference to FIG. 2.

Figure 2:
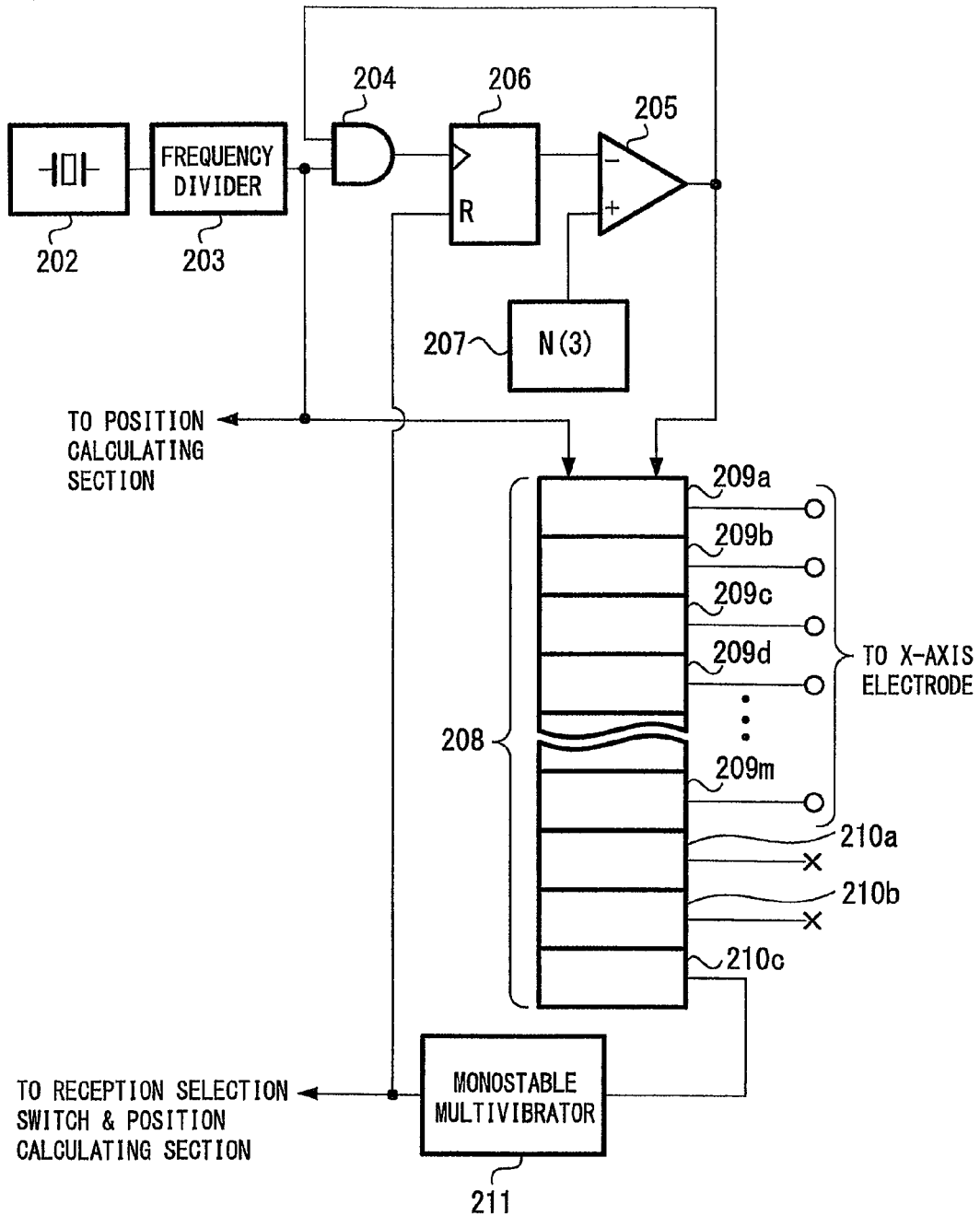
FIG. 2 is a block diagram showing an internal configuration of a rectangular wave generating section of the position detecting device of FIG. 1.

FIG. 2 is a block diagram showing an internal configuration of the rectangular wave generating section 102 according to one embodiment.

The rectangular wave generating section 102 includes a clock generator 202, a frequency divider 203, an AND gate 204, a counter 206, a digital comparator 205, a constant number N 207, a shift register 208, and a monostable multivibrator 211.

The clock generator 202 is an oscillator for generating a clock of a rectangular wave having a predetermined frequency. In the present embodiment, the clock generator 202 generates a rectangular wave having a frequency of, for example, 12 MHz (i.e., having a period of 8.33 ns). The clock of 12 MHz generated by the clock generator 202 is supplied to the frequency divider 203.

The frequency divider 203 is a known programmable counter. The frequency divider 203 counts a specified number of clocks inputted from the clock generator 202, and the frequency of the clock is frequency-divided into 1/N. In the present embodiment, the frequency dividing ratio of the frequency divider 203 is set to $1/10$, so that the clock is frequency-divided into 1200 kHz in frequency (i.e., 0.833 μs in period).

The signal of the rectangular wave of 1200 kHz (simply referred to as "rectangular wave" hereinafter) outputted from the frequency divider 203 is supplied as the clock pulse to the AND gate 204 while being supplied also to the shift register 208 and the position calculating section 106, which is to be described later.

The AND gate 204 is a known gate for outputting a logical AND of an inputted digital value. The AND gate 204 supplies the clock pulse outputted from the frequency divider 203 to the counter 206 only when the signal supplied from the digital comparator 205 having a high potential which represents "true" (i.e., value of "1") is inputted.

The counter 206 is a known counter for incrementing an outputted numeric value at rising edges of an inputted signal. The outputted numeric value of the counter 206 is reset when a high potential which represents "true" is applied to a reset terminal thereof. Incidentally, the initial value of the counter 206 is set to "0".

An input terminal of the counter 206 is connected to an output terminal of the AND gate 204, and the reset terminal of the counter 206 is connected to the monostable multivibrator 211, which is to be described later.

When the clock pulse is inputted from the AND gate 204, the counter 206 outputs a counting value (0, 1, 2, . . . ) that is incremented by one every time the rising edge of the clock pulse is inputted. Further, when a pulse signal outputted from the monostable multivibrator 211 is inputted to the reset terminal, the counter 206 resets the counting value thereof and outputs a "0".

The digital comparator 205 is a comparator for comparing two input numeric values. The digital comparator 205 compares the numeric value inputted from a positive input terminal and the numeric value inputted from a negative input terminal, and outputs a high potential which represents "true" (i.e., "1") when the numeric value inputted from the positive input terminal is larger than the numeric value inputted from the negative input terminal.

The constant number N 207 is connected to the positive input terminal of the digital comparator 205, and the counter 206 is connected to the negative input terminal of the digital comparator 205. Thus, the digital comparator 205 compares the counting value of the counter 206 inputted from the negative input terminal and the value of the constant number N 207 inputted from the positive input terminal, and outputs value "1" when the value of the constant number N 207 is larger than the output value of the counter 206, and outputs value "0" when the value of the constant number N 207 is equal to or smaller than the counting value of the counter 206. The logical value output indicating the comparison result of the digital comparator 205 is inputted to both the AND gate 204 and the shift register 208.

A register or the like is used as the constant number N 207. The constant number N 207 is a natural number by which 200 kHz is multiplied, to thereby speed up the effective scanning speed of the position detecting device, as will be more fully described below. In the present embodiment, N is set to "3". The constant number N 207 is inputted to the positive input terminal of the digital comparator 205.

The shift register 208 is a known serial input/parallel output type shift register. Examples of the shift register 208 include a known cascade-connected D flip-flop. The shift register 208 includes a plurality of (specifically, m pieces of)

valid bit cells 209a to 209m and three pieces of invalid bit cells 210a, 210b and 210c at a terminal thereof, in the described embodiment. The valid bit cells 209a to 209m are respectively connected to the electrodes of the X-axis electrode group 107. The X-axis electrode group 107 is not connected to the invalid bit cells 210a, 210b and 210c.

Among the invalid bit cells 210a, 210b and 210c, the last invalid bit cell 210c is connected to the monostable multivibrator 211.

The monostable multivibrator 211 supplies the logical value output thereof to the reset terminal of the counter 206, the reception selection switch 104, and the position calculating section 106.

In response to the rising edge of the clock pulse outputted from the frequency divider 203, the shift register 208 stores the output value of the digital comparator 205 while shifting the value stored in each cell to an adjacent cell (for example, the value stored in the valid bit cell 209a is shifted to the valid bit cell 209b).

When a logical value "1" is inputted to one of the valid bit cells 209a to 209m of the shift register 208 from the digital comparator 205 or from an adjacent cell immediately before the said valid bit cell, the shift register 208 outputs a high potential to an electrode of the X-axis electrode group 107 connected to the valid bit cell to which the logical value "1" is inputted at the time when the rising edge of the clock pulse is inputted.

Similarly, when a logical value "0" is inputted to one of the valid bit cells 209a to 209m of the shift register 208 from the digital comparator 205 or from an adjacent cell immediately before the said valid bit cell, the shift register 208 outputs a low potential to an electrode of the X-axis electrode group 107 connected to the valid bit cell to which the logical value "0" is inputted at the time when the rising edge of the clock pulse is inputted.

When a logical value "1" is inputted to one of the valid bit cells 209a to 209m where previously a logical value "0" has been inputted, the potential of the X-axis electrode group 107 is changed from low potential to high potential. On the other hand, when a logical value "0" is inputted to one of the valid bit cells 209a to 209m where previously a logical value "1" has been inputted, the potential of the X-axis electrode group 107 is changed from high potential to low potential.

In other words, by changing the logical value inputted to each of the valid bit cells 209a to 209m in the order of "0"→"1"→"0", the shift register 208 supplies a one-shot pulse to each of the electrodes of the X-axis electrode group 107.

The monostable multivibrator 211 outputs a pulse signal having a predetermined pulse width using the rising edge of an input signal (a signal outputted from the invalid bit cell 210c) as a trigger. In the present embodiment, the predetermined pulse width of the pulse signal is set to be shorter than one clock period. In other words, the monostable multivibrator 211 is provided for generating the reset pulse of the counter 206 at the rising edge of the signal outputted by the invalid bit cell 210c.

Next, the operation of the rectangular wave generating section 102 will be described below.

Since the initial value of the counter 206 is "0", a is outputted from the output terminal thereof. The digital comparator 205 compares the numeric value "0" outputted from the counter 206 with the numeric value obtained from the constant number N 207 (N=3 in the described embodiment). At this time, since the numeric value of the constant number N 207 is larger than the value inputted from the counter 206, a logical value "1" is outputted from the digital comparator 205. As a result, since the logical value "1" is inputted to the AND gate 204 from the digital comparator 205, the AND gate 204 supplies the clock pulse outputted from the frequency divider 203 to the counter 206. Since the clock pulse is inputted from the AND gate 204, the counter 206 outputs a value "1".

Thereafter, the value "1" outputted from the counter 206 is inputted to the digital comparator 205, and the AND gate 204, the counter 206, and the digital comparator 205 repeat the aforesaid operations until the value inputted from the counter 206 to the digital comparator 205 becomes "3".

When the value inputted from the counter 206 to the digital comparator 205 becomes "3", the value ("3") inputted from the negative input terminal equals the numeric value "3" of the constant number N 207 inputted from the positive input terminal. Thus, the digital comparator 205 outputs "false", that is, the digital comparator 205 outputs value "0". As a result, AND gate 204 stops supplying the clock pulse to the counter 206. Thus, the counting operation performed by the counter 206 is stopped by the AND gate 204. In other words, when the aforesaid operation is performed, the digital comparator 205 outputs logical values of "1110 . . . " in this order at the timing of the clock pulse.

Next, the operation of the shift register 208 will be described below.

The logical value outputted from the digital comparator 205 is supplied to the valid bit cell 209a of the shift register 208. In response to the rising edge of the next clock pulse supplied from the frequency divider 203, the shift register 208 shifts the value "1" stored in the valid bit cell 209a to the adjacent valid bit cell 209b while storing a value "1" newly outputted from the digital comparator 205 in the valid bit cell 209a. Thereafter, the shift register 208 sequentially shifts the value stored in a specified valid bit cell 209x to the adjacent valid bit cell 209(x+1) every time the clock pulse is inputted.

The value stored in the last valid bit cell 209m is supplied to the first invalid bit cell 210a. Similarly, the value stored in the first invalid bit cell 210a is supplied to the adjacent invalid bit cell 210b, and the value stored in the invalid bit cell 210b is supplied to the last invalid bit cell 210c.

Further, the value stored in the last invalid bit cell 210c is supplied to the monostable multivibrator 211 when the next clock pulse is inputted to the shift register 208.

In such a manner, the shift register 208 keeps shifting the data, so that the values "111" inputted at the first stage reach the invalid bit cells 210a to 210c.

When the logical value "1" reaches the last invalid bit cell 210c, the potential of the output terminal of the invalid bit cell 210c changes from low potential to high potential. In response to the voltage change (i.e., in response to the rising edge), the monostable multivibrator 211 generates a reset pulse. The reset pulse is inputted to the reset terminal of the counter 206, so that the counter 206 is reset.

Thereafter, if the next value "1" is inputted to the monostable multivibrator 211, the monostable multivibrator 211 will not supply a pulse signal for resetting the counter 206, and therefore the counter 206 will restart counting at this point.

In such a manner, the rectangular wave generating section 102 supplies the one-shot pulses to the X-axis electrode group 107.

Next, the configuration of the position calculating section 106 and the reception selection switch 104, and the position detecting operation thereof will be described below with reference to FIG. 3.

First, the configuration of the reception selection switch 104 will be described below. The reception selection switch 104 includes a loop counter 104a and a change-over switch 104b.

The loop counter 104a is a known programmable N-ary counter. The loop counter 104a is set so that the maximum value thereof is equal to the total number of the electrodes of the Y-axis electrode group 108, which is the receiving electrode. In the present embodiment, the total number of the electrodes of the Y-axis electrode group 108 is n. The loop counter 104a counts the reset pulse outputted from the monostable multivibrator 211 of the rectangular wave generating section 102.

An analog multiplexer, for example, is used as the change-over switch 104b. The number of the change-over terminals of the change-over switch 104b is equal to the total number of the electrodes of the Y-axis electrode group 108. From the n pieces of electrodes of the Y-axis electrode group 108, the change-over switch 104b selects one electrode which corresponds to the counting value inputted from the loop counter 104a.

The electrodes of the Y-axis electrode group 108 connected to the change-over switch 104b are respectively denoted by numbers from 1 to n. The change-over switch 104b selects the electrode denoted by the number equal to the counting value inputted from the loop counter 104a. Further, the weak current outputted from the electrode of the Y-axis electrode group 108 selected by the change-over switch 104b is inputted to the subsequent preamplifier 109.

The counting value of the loop counter 104a is inputted as the address for the change-over switch 104b. Thus, the change-over switch 104b sequentially selects one electrode from n electrodes of the Y-axis electrode group 108 based on the counting value of the loop counter 104a. For example, if the output value of the loop counter 104a is "1", then the change-over switch 104b selects the first electrode of the Y-axis electrode group 108. If the output value of the loop counter 104a is "2", then the change-over switch 104b selects the second electrode of the Y-axis electrode group 108.

In the same manner, after the n-th electrode (the last electrode) of the Y-axis electrode group 108 has been selected, the loop counter 104a returns to the initial numeric value (i.e., returns to "1") upon receiving the next reset pulse from the monostable multivibrator 211.

Next, the configuration of the position calculating section 106 will be described below with continued reference to FIG. 3.

The position calculating section 106 includes an integrating section 302, a buffer memory 303, a peak detecting section 304, a gravity center (or a center of gravity) calculating section 305, and a counter 306.

The integrating section 302 integrates the digital value obtained from the A/D converter 105. The integrating section 302 includes, for example, a memory and an adder (both not shown). The integrating section 302 is connected to the A/D converter 105 and the buffer memory 303. The integrating section 302 adds the value inputted thereto and the value stored in its memory, and stores the calculation value result therein.

The clock pulse outputted from the rectangular wave generating section 102 is inputted to the integrating section 302. The integrating section 302 stores the calculation value every time the clock pulse is inputted. The integrating section 302 also outputs the stored calculation value every time the clock pulse is inputted.

The buffer memory 303 is a RAM for temporarily storing the output value of the integrating section 302. The buffer memory 303 has a storage capacity for storing data of at least three pieces of electrodes of the Y-axis electrode group 108. This is because the gravity center calculating section 305 needs to perform the gravity center calculation in not only the X-axis direction, but also in the Y-axis direction of the matrix electrode 103. (In one embodiment, the gravity center calculation requires use of data of three electrode addresses, as will be more fully described below.) The buffer memory 303 is connected to the integrating section 302, the peak detecting section 304, and the gravity center calculating section 305.

The clock pulse outputted from the rectangular wave generating section 102 and the X-axis direction address information outputted from the counter 306, which is to be described later, are supplied to the buffer memory 303. Here, the clock pulse is used as a timing pulse for the buffer memory 303 to store the output value of the integrating section 302. In other words, the X-axis direction address information and the clock pulse outputted from the rectangular wave generating section 102 are used for addressing the buffer memory 303, so that the output value of the integrating section 302 is stored therein.

In one embodiment, the number of the calculation value data outputted from the integrating section 302 and stored in the buffer memory 303 equals three times the number of the electrodes of the X-axis electrode group 107 (corresponding to data for three electrodes of the Y-axis electrode group 108). This is because when performing the gravity center calculation, the gravity center calculating section 305 needs to perform the gravity center calculation not only in the X-axis direction but also in the Y-axis direction.

The peak detecting section 304 is provided for detecting a peak value of the data stored in the buffer memory 303. The peak detecting section 304 is connected to the buffer memory 303 and the gravity center calculating section 305. The peak detecting section 304 outputs an address in the buffer memory 303 indicated by the detected peak value to the subsequent gravity center calculating section 305.

The gravity center calculating section 305 is provided for calculating the gravity center (i.e., coordinates of the position indicated by a finger of a human body on the position detecting device 101) based on acquired data. The peak detecting section 305 is connected to the buffer memory 303 and the gravity center calculating section 304. A Y-axis direction address outputted from the reception selection switch 104, the clock pulse outputted from the rectangular wave generating section 102, and the X-axis direction address outputted from the counter 306 are inputted to the gravity center calculating section 305.

Based on the address in the buffer memory 303 indicated by the peak value inputted from the peak detecting section 304, the gravity center calculating section 305 acquires data of three addresses including the address indicated by the peak value and the two addresses before and after the address indicated by the peak value. Then, the gravity center calculating section 305 calculates the gravity center based on data of the three addresses.

The position of the gravity center (i.e., the result calculated by the gravity center calculating section 305) represents the position of the finger on the matrix electrode 103 (i.e., represents the position data).

In order to identify the position where the peaks in both the X-axis direction and the Y-axis direction of the matrix electrode 103 appear when performing gravity center calculation, the gravity center calculating section 305 receives the address data in the X-axis direction and the address data in the Y-axis direction, respectively, from the counter 306 and the reception selection switch 104.

The counter 306 counts the clock pulse outputted from the rectangular wave generating section 102, and is reset by the reset pulse outputted from the rectangular wave generating section 102. The output value (i.e., the counting result) of the counter 306 equals the address of the electrode selected from the electrodes of the X-axis electrode group 107.

The output value of the counter 306, as the address in the X-axis direction, is supplied to the buffer memory 303 and the gravity center calculating section 305.

Next, the operating principle of the position detecting device according to the present embodiment will be described below with reference to FIG. 4. In order to facilitate understanding, the present embodiment is explained by microscopically describing signal changes caused in the X-axis electrode group 107 and Y-axis electrode group 108. Specifically, the waveform of a signal outputted from a Y-axis electrode 406 (which is an arbitrary electrode) of the Y-axis electrode group 108, when the rectangular wave is supplied to a first X-axis electrode 402 and a second X-axis electrode 403 of the X-axis electrode group 107, will be described below with reference to the circuit diagram of FIG. 4A.

Figure 3:
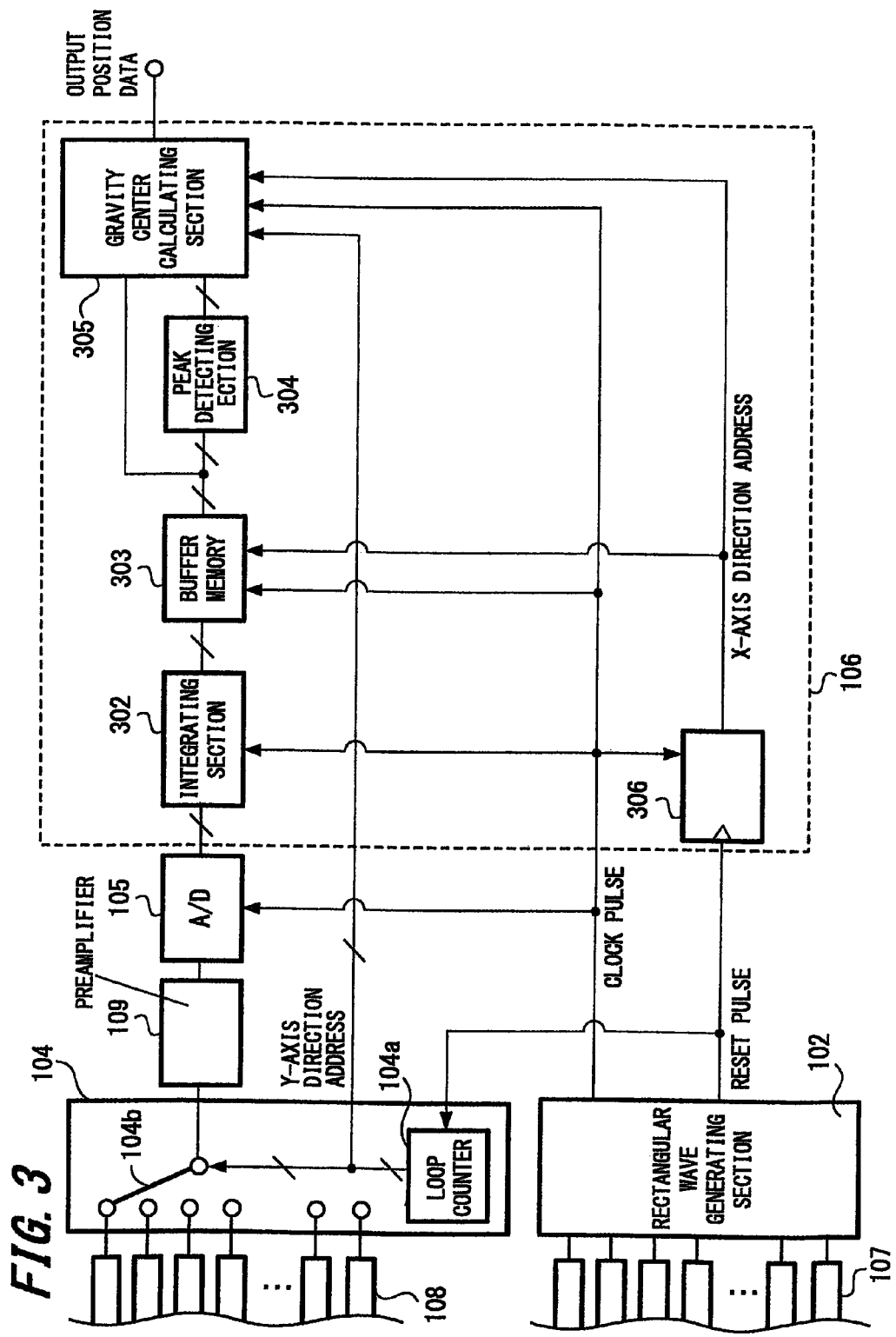
FIG. 3 is a block diagram showing an internal configuration of a position calculating section of the position detecting device of FIG. 1.
Figure 4A:
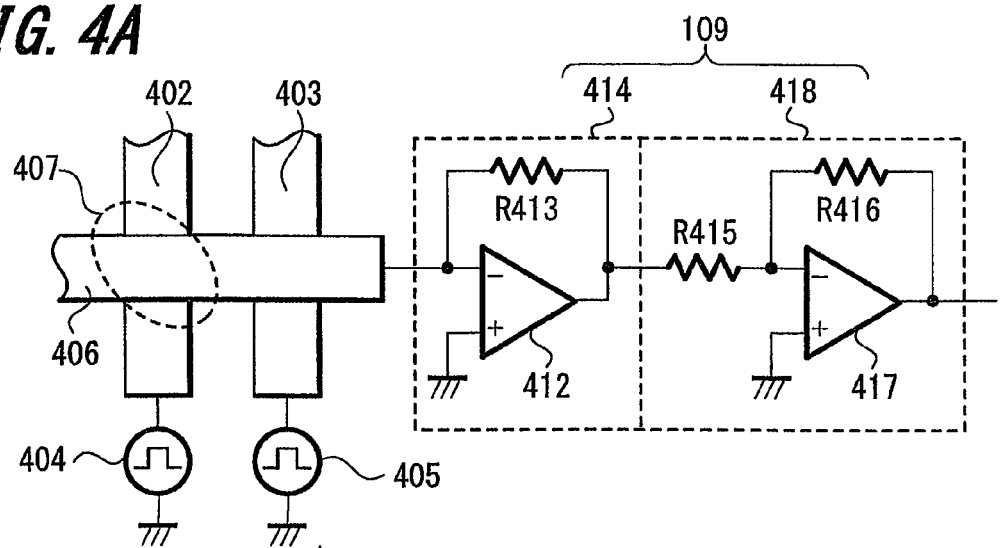
FIG. 4A shows an equivalent circuit and FIGS. 4B-4H show related waveform diagrams, of the position detecting device of FIG. 1.

When focusing on the first X-axis electrode 402, the second X-axis electrode 403, and the Y-axis electrode 406, the rectangular wave generating section 102, the X-axis electrode group 107, the Y-axis electrode group 108, and the preamplifier 109 shown in FIG. 3 can be expressed as an equivalent circuit shown in FIG. 4A. Since the rectangular wave generating section 102 (which is provided to supply the rectangular wave to the first X-axis electrode 402 and the second X-axis electrode 403) supplies the rectangular wave to the first X-axis electrode 402 and the second X-axis electrode 403, respectively, it can be equivalently considered that a first rectangular wave voltage source 404 and a second rectangular wave voltage source 405 are respectively connected to the first X-axis electrode 402 and the second X-axis electrode 403. In FIG. 4A, a finger 407 is indicated by a dotted-line oval.

In the illustrated embodiment, the Y-axis electrode 406 is connected to the preamplifier 109. The preamplifier 109 includes a current-voltage conversion circuit 414 and a driver 418. The current-voltage conversion circuit 414 includes an operational amplifier 412 and a resistor 413. The input terminal of the operational amplifier 412 of the current-voltage conversion circuit 414 is virtually maintained in a short state due to a known imaginary short phenomenon. Thus, when viewing from the Y-axis electrode 406, the input terminal of the operational amplifier 412 is in an equivalently grounded state.

The current-voltage conversion circuit 414 converts a very weak current into a voltage, and amplifies the converted voltage. Further, the amplified voltage signal is inputted to the inverting amplifier (driver) 418, which is composed of a resistor 415, a resistor 416, and an operational amplifier 417, to be amplified to a proper level so that the signal can be easily processed in the subsequent circuit. Incidentally, the current-voltage conversion circuit 414 is also an inverting amplifier, and therefore the inputted signal is re-inverted and, as a result, the signal is inverted back to its original phase.

Next, the difference in the current waveform appearing in the Y-axis electrode 406 between the case where the finger 407 approaches the intersection of the electrodes (e.g., the intersection of the X-axis electrode 402 and the Y-axis electrode 406) and the case where the finger 407 does not approach the intersection of the electrodes (e.g., the intersection of the X-axis electrode 403 and the Y-axis electrode 406) will be described below with reference to FIGS. 4B through 4F.

When the voltage of a rectangular wave is applied to a capacitor, a current flows through the capacitor only at the rising timing and the falling timing of the voltage of the rectangular wave. Thus, since a capacitor is formed at the intersection of the first X-axis electrode 402 or 403 and the Y-axis electrode 406, the same phenomenon will apply to this capacitor.

Figure 4B:
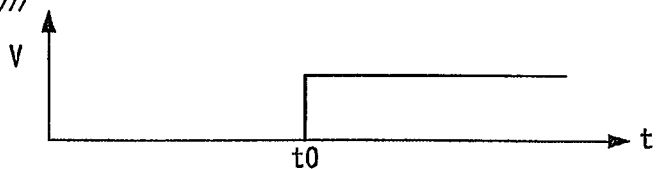
Figure 4C:
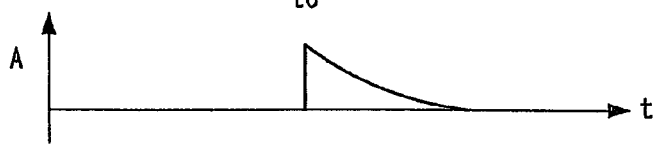

Thus, when the finger 407 does not approach the intersection of the electrodes (i.e., when a rectangular wave signal that rises at time point t0 as shown in FIG. 4B is applied from the second rectangular wave voltage source 405 to the second X-axis electrode 403), a current flows through the capacitor only at the rising timing of the rectangular wave signal applied to the capacitor formed between the second X-axis electrode 403 and the Y-axis electrode 406. As a result, the current flowing through the capacitor has a waveform shown in FIG. 4C.

Figure 4D:
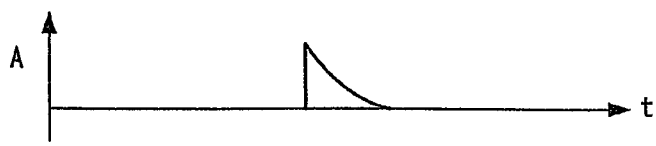

In contrast, when the finger 407 approaches the intersection of the electrodes (i.e., when a rectangular wave signal as shown in FIG. 4B is applied from the first rectangular wave voltage source 404 to the first X-axis electrode 402), the lines of electric force field generated by the first X-axis electrode 402 are partially drawn toward the finger 407. As a result, since the capacitance of the capacitor formed at the intersection of the electrodes is reduced in the case where the finger 407 approaches the intersection of the electrodes (see FIG. 4D) compared with the case where the intersection of the electrodes does not have the finger 407 approaching thereto (see FIG. 4C), the total area of the current waveform shown in FIG. 4D is smaller than that of the current waveform shown in FIG. 4C. Incidentally, as is commonly known, the total area of the current waveform corresponds to the charge stored in the capacitor.

Figure 4E:
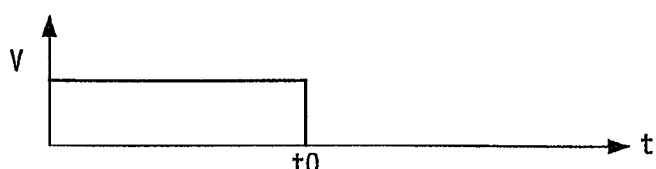
Figure 4F:
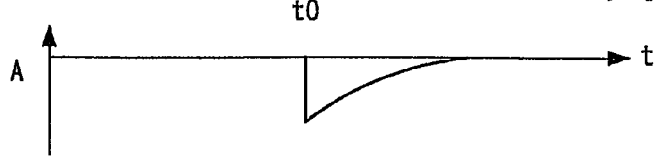

As shown in FIG. 4E, in the case where a rectangular wave signal that falls at time point t0 is applied to an X-axis electrode, there will appear a waveform having a phase inverted by 180° from the current waveform appearing in the case where a rectangular wave signal that rises at time point t0 is applied. In other words, in the case where the finger 407 does not approach the intersection of the electrodes (e.g., the X-axis electrode 403 and the Y-axis electrode 406), a current waveform shown in FIG. 4F will appear when a rectangular wave signal shown in FIG. 4E is applied from the second rectangular wave voltage source 405 to the second X-axis electrode 403.

Similarly, although not shown in the drawings, when the finger 407 approaches the intersection of the electrodes (i.e., when a rectangular wave signal as shown in FIG. 4E is applied from the first rectangular wave voltage source 404 to the first X-axis electrode 402), the lines of electric force field generated by the first X-axis electrode 402 are partially drawn toward the finger 407, and therefore there will appear a waveform having a phase inverted by 180° from the current waveform shown in FIG. 4D.

Next, a case where the rectangular wave signal is applied to both the first X-axis electrode 402 and the second X-axis electrode 403 at time point t0 will be described below.

A case where the finger 407 does not approach the intersection of the first X-axis electrode 402 and the Y-axis electrode 406 (unlike as shown in FIG. 4A) will be described below first.

Figure 4G:
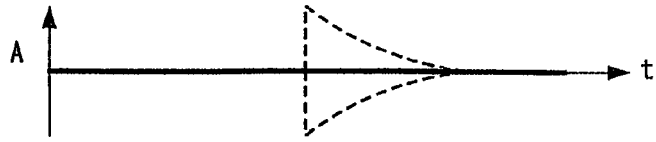

At time point t0, when a rising voltage (as shown in FIG. 4B) is applied from the first rectangular wave voltage source 404 to the first X-axis electrode 402 and a falling voltage (as shown in FIG. 4E) is applied from the second rectangular wave voltage source 405 to the second X-axis electrode 403, since the capacitance of the capacitor formed at the intersection of the first X-axis electrode 402 and the Y-axis electrode 406 is equal to the capacitance of the capacitor formed at the intersection of the second X-axis electrode 403 and the Y-axis electrode 406, the currents generated in the respective intersections will cancel each other (as shown in FIG. 4G). As a result, no current waveform is generated in the Y-axis electrode 406.

Figure 4H:
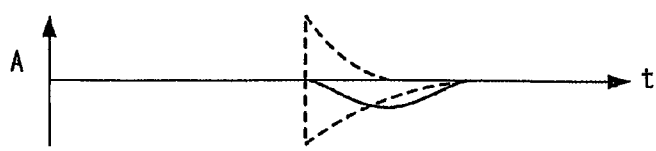

In contrast, as shown in FIG. 4A, at time point to, in the case where the finger 407 approaches the intersection of the first X-axis electrode 402 and the Y-axis electrode 406, when a rising voltage (as shown in FIG. 4B) is applied from the first rectangular wave voltage source 404 to the first X-axis electrode 402 and a falling voltage (as shown in FIG. 4E) is applied from the second rectangular wave voltage source 405 to the second X-axis electrode 403, the capacitance of the capacitor formed at the intersection of the first X-axis electrode 402 and the Y-axis electrode 406 is reduced compared with the capacitance of the capacitor formed at the intersection of the second X-axis electrode 403 and the Y-axis electrode 406. As a result, a current waveform flowing in a negative direction is generated in the Y-axis electrode 406 (as shown in FIG. 4H).

As described above, in the case where the finger 407 approaches the intersection of the X-axis electrode and the Y-axis electrode, the capacitance of the capacitor formed at the intersection is reduced. The voltage change caused at a rising edge or a falling edge is applied to the intersection where the capacitance is reduced and a current is generated due to the voltage change. At this time, the waveform of a composite current, including the current generated at this intersection and the currents generated at other intersections due to the voltage change, is generated in the corresponding Y-axis electrode.

Next, the operating principle of the present embodiment will be described below based on the aforesaid mechanism of detecting the existence of the finger 407 with reference to FIGS. 5A-5J.

Figure 5A:
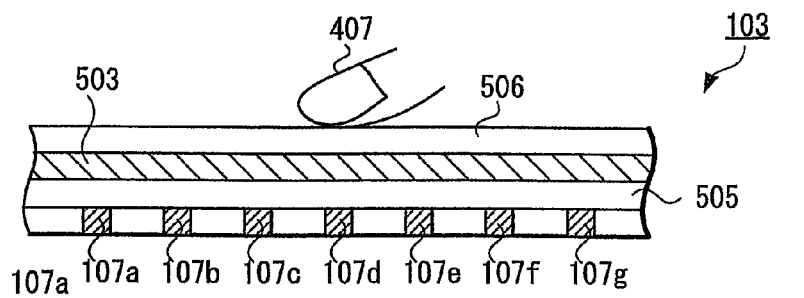
FIG. 5A shows a partial cross section of a matrix electrode of the position detecting device of FIG. 1, where voltages are applied to X-axis electrodes of the matrix electrode.
Figure 5B:
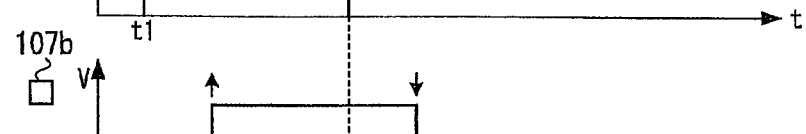
FIGS. 5B-5J show related current waveforms and integrated current waveforms.

The matrix electrode 103 has the X-axis electrode group 107 (X-axis electrodes 107a-107g are shown), the Y-axis electrode group 108 (only one Y-axis electrode 503 is shown), and a first dielectric (e.g., insulating) sheet 505 interposed between the X-axis electrode group 107 and the Y-axis electrode group 108. Further, the matrix electrode 103 has a second insulating sheet 506 arranged on the opposite side of the Y-axis electrode group 108/503 to the side facing the first dielectric sheet 505. Incidentally, the Y-axis electrode 503 is shown in FIG. 5A as one electrode of the Y-axis electrode group 108.

The first dielectric sheet 505 is, for example, a substantially plate-like insulating sheet for substantially insulating each of the intersections of the X-axis electrode group 107 and the Y-axis electrode group 108.

The second insulating sheet 506 is a substantially plate-like insulating sheet. The X-axis electrodes 107a-107g are protected by the second insulating sheet 506 so as not to be touched directly by the finger 407 indicating a position. Therefore, the X-axis electrode group 107 is arranged close to the finger 407 with the second insulating sheet 506 interposed therebetween, so that the X-axis electrode group 107 can be electrostatically coupled with the finger 407 effectively.

FIGS. 5B to 5H are waveform diagrams showing timing of the voltage applied to X-axis electrodes 107a to 107g of the X-axis electrode group 107, respectively. In the illustrated embodiment, times t1 to t7 shown in FIGS. 5B to 5H represent the time when the one-shot pulse is applied to the X-axis electrodes 107a to 107g, respectively, wherein time point t2 represents the time when one clock has elapsed from time point t1, and similarly, time point to represents the time when one clock has elapsed from time point t(n−1).

Note that, as has been described above, when a value "1" is inputted, the valid bit cell 209a of the rectangular wave generating section 102 applies a high-potential voltage to the X-axis electrode 107a at the time when the clock outputted from the frequency divider 203 reaches a rising edge. The valid bit cell 209a keeps applying the voltage to the X-axis electrode 107a until the time when a rising edge of the next clock comes. Thereafter, when a value "0" is inputted, the valid bit cell 209a applies a low-potential voltage to the X-axis electrode 107a at the time when the clock reaches a rising edge. The same operation as described above is performed on each of the valid bit cells 209b to 209m.

In the illustrated embodiment, the bit width of the voltage applied from the valid bit cell 209a to the X-axis electrode 107a is determined by a logic signal formed by the AND gate 204, the counter 206, the constant number N 207, and the digital comparator 205, and outputted from the digital comparator 205. When the value "3" is stored in the constant number N 207, the logic signal is formed so as to have a tripled period compared to that of the clock outputted from the frequency divider 203. Thus, since the value "1" is continuously inputted to the shift register 208 for three times, the logic signal becomes a one-shot pulse whose period is three times that of the clock inputted to the shift register 208.

As a result, when using time point t1, at which the one-shot pulse is applied to the X-axis electrode 107a, as a reference point for example, the falling edge of the one-shot pulse applied to the X-axis electrode 107a occurs at time point t4.

As has been described above, the rectangular wave generating section 102 sequentially applies the one-shot pulse to the X-axis electrodes 107a to 107g connected to the shift register 208. Thus, among the time points when the one-shot pulses sequentially applied to the X-axis electrodes 107a to 107g simultaneously reach the rising edge and falling edge (e.g., at time point t5 when the falling edge of the one-shot pulse of FIG. 5C and the rising edge of the one-shot pulse of FIG. 5F occur simultaneously), the resulting currents cancel each other at the positions where the finger 407 does not approach intersections, according to the principle described above with reference to FIG. 4G. Thus, no current waveform is generated at the time points when the one-shot pulses applied to the X-axis electrodes simultaneously generate rising and falling edges in the case where the finger 407 does not approach those intersections formed by the X-axis electrodes.

Figure 5C:
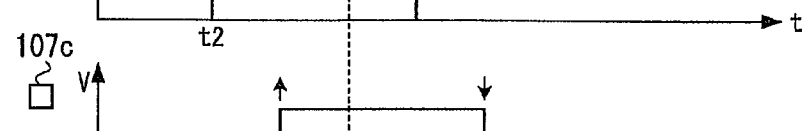

For example, in the waveform of the X-axis electrode 107b shown in FIG. 5C, the falling edge of the one-shot pulse occurs at time point t5. Similarly, in the waveform of the X-axis electrode 107e shown in FIG. 5F, the rising edge of the one-shot pulse occurs at time point t5. Further, the finger 407 does not approach either the X-axis electrode 107b or the X-axis electrode 107e. Thus, at time point t5, since the current flowing in the Y-axis electrode 503 generated by the falling edge of the one-shot pulse that appears in the X-axis electrode 107b and the current flowing in the Y-axis electrode 503 generated by the rising edge of the one-shot pulse that appears in the X-axis electrode 107e are combined (and canceled) with each other, no current waveform will be generated in the Y-axis electrode 503.

Figure 5D:
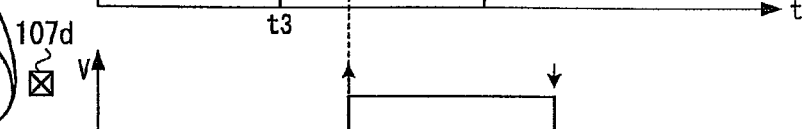
Figure 5E:
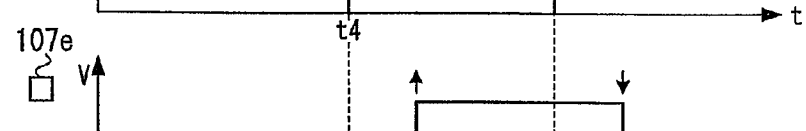
Figure 5F:
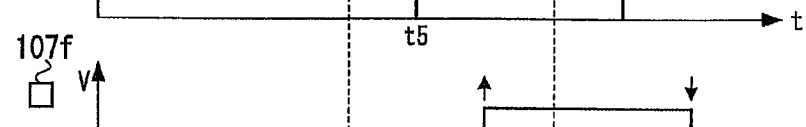
Figure 5G:
Figure 5H:
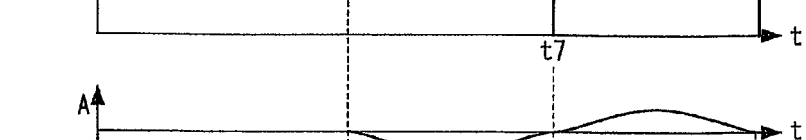

In the same manner, at other time points than time point t5 of the X-axis electrode that the finger 407 does not approach, for example, at time point t6, the falling edge of the one-shot pulse (as shown in FIG. 5D) appears in the X-axis electrode 107c, and similarly the rising edge of the one-shot pulse (as shown in FIG. 5G) appears in the X-axis electrode 107f. The finger 407 does not approach either the X-axis electrode 107c or the X-axis electrode 107f. Thus, at time point t6, since the current flowing in the Y-axis electrode 503 generated by the falling edge of the one-shot pulse that appears in the X-axis electrode 107c and the current flowing in the Y-axis electrode 503 generated by the rising edge of the one-shot pulse that appears in the X-axis electrode 107f are combined with each other, no current waveform will be generated in the Y-axis electrode 503.

On the other hand, as shown in FIGS. 5A and 5E, since the finger 407 approaches the intersection of the X-axis electrode 107e and the Y-axis electrode 503, the current obtained by combining the current flowing in the Y-axis electrode 503 generated by the one-shot pulse applied to the X-axis electrode 107a (FIG. 5B) and the current flowing in the Y-axis electrode 503 generated by the one-shot pulse applied to the X-axis electrode 107d (FIG. 5E) does not become zero at time point t4. Similarly, the current obtained by combining the current flowing in the Y-axis electrode 503 generated by the one-shot pulse applied to the X-axis electrode 107d (FIG. 5E) and the current flowing in the Y-axis electrode 503 generated by the one-shot pulse applied to the X-axis electrode 107g (FIG. 5H) does not become zero at time point t7.

Figure 5I:

As a result, as shown in FIG. 5I, the non-zero current waveform appears at time point t4 at which the rising edge of the one-shot pulse applied to the X-axis electrode 107a, to which the finger 407 approaches, appears and at time point t7 at which the falling edge of the one-shot pulse appears.

Figure 5J:
Figure 6:
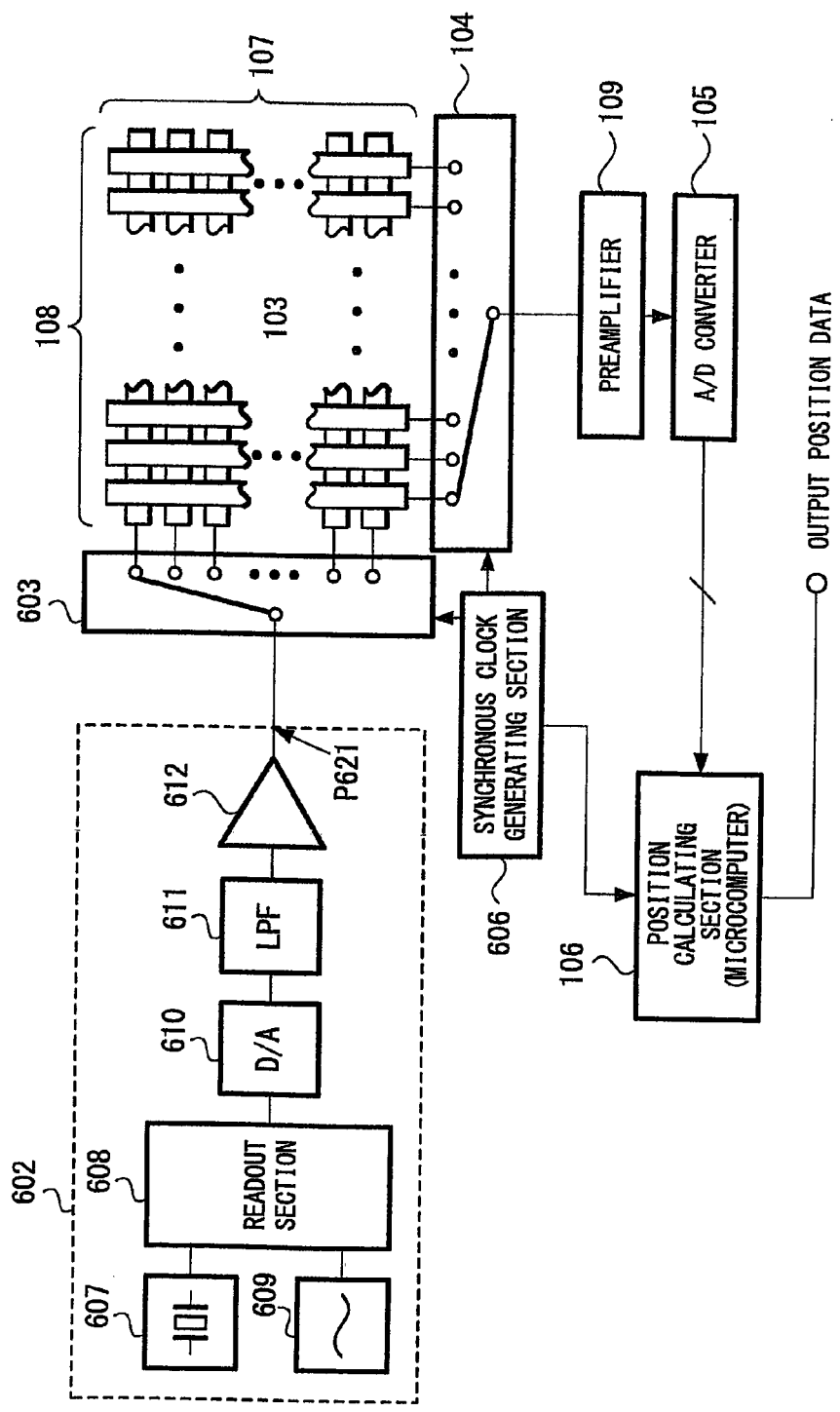
FIG. 6 is a block diagram showing an electrostatic capacity type position detecting device according to the prior art.

As shown in FIG. 5I, the current waveform appears in the Y-axis electrode 503 has a substantially symmetrical AC sine waveform with zero voltage as the symmetry center. If the current waveform is integrated as illustrated, a waveform having a peak in the negative direction as shown in FIG. 5J will be obtained. The peak detecting section 304 determines the value of a sample clock closest to the peak of the waveform. The gravity center calculating section 305 performs gravity center calculation based on three values, which are: the value obtained by the peak detecting section 304, and the values before and after the value obtained by the peak detecting section 304.

In order to identify the position where the peaks in the X-axis direction and Y-axis direction of the matrix electrode 103 appear, the gravity center calculating section 305 receives the address data in the X-axis direction from the counter 306 and receives the address data in the Y-axis direction from the reception selection switch 104, respectively. Based on the address data in the X-axis direction, the address data in the Y-axis direction, and the result of the gravity center calculation, the gravity center calculating section 305 calculates the real peak value and the position of the real peak value on a time axis. The gravity center calculating section 305 outputs the calculated result as position data which indicates the position of the finger having approached the matrix electrode 103.

In the illustrated embodiment, the period of the one-shot pulse applied to X-axis electrodes 107a to 107g equals one half of the period of 200 kHz. On the other hand, the timing (or the frequency) at which the one-shot pulse is applied to the X-axis electrodes 107a to 107g is an integer multiple of 200 kHz. In the present embodiment, the timing (or the frequency) at which the one-shot pulse is applied to the X-axis electrodes 107a to 107g is three times 200 kHz, or 600 kHz.

Thus, in the present embodiment, when the entire X-axis electrode group 107 is viewed sequentially in a longitudinal direction, the scanning speed is effectively tripled.

In the prior art, the AC voltage of 200 kHz needs to be subjected to a synchronous-detection and integration process over a plurality of periods. Even when a prior art device is designed to allow the synchronous-detection and integration process to be performed in one period, since there is an inherent constraint that the frequency of the AC voltage is 200 kHz, the scanning speed cannot be radically increased.

The present embodiment is one of the exemplary embodiments of the present invention that overcome the "wall of 200 kHz," which has been a challenge in the prior art.

In the illustrated embodiment, when sequentially supplying the one-shot pulse whose phase is shifted to the X-axis electrode group 107, it is necessary for the Y-axis electrode group 108 to simultaneously detect the rising edge and the falling edge of the one-shot pulses and detect the difference between the rising edge and the falling edge. Thus, the frequency of the phase shift is set to be an integer multiple of 200 kHz.

Note that, although the present invention is described based on the aforesaid embodiments, it should be understood that various changes including the following changes can be made without departing from the spirit and objects of the present invention.

First, the waveform of the signal applied to each of the electrodes of the X-axis electrode group 107 does not have to be rectangular.

For example, the current changes shown in FIG. 4G can also cancel each other as long as the voltage integration value of the duration from zero to a predetermined voltage (i.e., the duration of the rising edge) and the voltage integration value of the duration from the predetermined voltage to zero (i.e., the duration of the falling edge) equal each other.

For example, the present invention includes a configuration in which a band-pass filter is arranged between each of the invalid bit cells 209a to 209m and each of the electrodes of the X-axis electrode group 107. With such a configuration, a half wavelength of a sine waveform is applied to each of the electrodes of the X-axis electrode group 107. With such a waveform, the finger can also be detected in a manner similar to the aforesaid embodiment.

Second, since the high potential and the low potential applied to the X-axis electrode group 107 are in relative relationship between low and high, the voltage of the low potential does not have to be zero.

Third, the frequency of the one-shot pulse applied to each of the X-axis electrode group 107, with a time difference between each pair of one-shot pulses, does not have to be precisely an integer multiple of 200 kHz. In such a case also, when the finger approaches the matrix electrode 103, based on the capacitance of the capacitor formed at each of the intersections of the X-axis electrodes and the Y-axis electrodes, there appears a signal change larger than that which appears when the finger does not approach the matrix electrode 103.

By applying the one-shot pulse having a frequency equal to an integer multiple of 200 kHz to each of the X-axis electrodes with a time difference, which is shorter than the time width of the one-shot pulse, and detecting a current change caused at rising edges and falling edges of the one-shot pulses in the X-axis electrodes, an electrostatic capacity type position detecting device having a large-sized position detection surface can be achieved without employing a complicated circuit to, for example, divide the detection surface.

It is to be understood that the present invention is not limited to the embodiments described above, and various modifications and applications can be made without departing from the spirit and scope of the present invention.

What is claimed is:

1. A capacitive type position detecting device comprising:
    (a) a plurality of first electrodes arranged in a first direction;

(b) a plurality of second electrodes arranged in a second direction that is substantially perpendicular to the first direction;

(c) a signal supplying circuit including a clock signal generator configured to generate a clock signal having a clock period of CLK, the signal supplying circuit being configured to supply signals having a waveform, which includes a determined time width (TIME_WIDTH) between a rising part and a falling part of the waveform, to the plurality of first electrodes arranged in the first direction when TIME_WIDTH is an integer (s≥2) multiple of CLK, wherein the signal supplying circuit is further configured to sequentially supply said signals of TIME_WIDTH to the first electrode Yn through Y{n+s} that are adjacent to each other per every CLK such that (s+1) is a total number of the first electrodes to which the rising parts of said signals of TIME_WIDTH are sequentially supplied within TIME_WIDTH, and the signal supplying circuit is further configured such that the rising part of the waveform in said signal supplied to the first electrode Y{n+s} occurs at the same time as the falling part of the waveform in said signal supplied to the first electrode Yn and no rising and falling parts of two adjacent first electrodes coincide with each other;

wherein, in a selected one of the second electrodes with which said first electrodes Yn and Y{n+s} intersect to form two intersections, a first current is generated at a timing of the rising part of the waveform supplied to said first electrode Y{n+s} and a second current is generated at a timing of the falling part of the waveform supplied to said first electrode Yn, the first current and the second current being combined to form a combined current signal in the selected one of the second electrodes, (d) a current-to-voltage converter configured to be directly coupled to only the selected one of the second electrodes to convert the combined current signal to an analog voltage signal;

(e) an A/D converter configured to convert the analog voltage signal to a digital voltage signal; and (f) a position calculating section configured to detect a position indicated by a position indicator on the position detecting device based on said digital voltage signal originating in the selected one of the second electrodes and received via said current-to-voltage converter and said A/D converter, wherein, in a case where the position indicator is not present near the two intersections, the first current and the second current generated at the timings of the rising and falling parts of the waveform substantially cancel each other in the selected one of the second electrodes, and in a case where the position indicator is present on or near one of the two intersections, the first current and the second current do not substantially cancel each other in the selected one of the second electrodes.

2. The position detecting device of claim 1, wherein the signals supplied to the plurality of first electrodes are signals having a rectangular waveform.

3. The position detecting device of claim 2, wherein the signal supplying circuit comprises a shift register having cells respectively corresponding to the plurality of first electrodes arranged in the first direction, and the signal supplying circuit is further configured to control input signals to the shift register to thereby generate said signals having a rectangular waveform, which includes the determined time width between a rising part and a falling part of the rectangular waveform, to be supplied to the plurality of first electrodes arranged in the first direction.

4. The position detecting device of claim 1, wherein the position calculating section is further configured to receive an input signal that indicates which one of the plurality of first electrodes is supplied with said signal having a waveform including the determined time width, and the position calculating section is further configured to detect the position indicated by the position indicator based on said input signal and signals received from the plurality of second electrodes.

5. The position detecting device of claim 4, further comprising a selection circuit configured to sequentially select the plurality of second electrodes arranged in the second direction, wherein the selection circuit is configured to selectively couple a determined one of the plurality of second electrodes to the current-to-voltage converter based on said input signal that indicates which one of the plurality of first electrodes is supplied with said signal having a waveform including the determined time width.

6. The position detecting device of claim 1, wherein the position calculating section comprises an integrating circuit for integrating the digital voltage signal originating in said selected one of the second electrodes, and the position calculation section is further configured to detect the position indicated by the position indicator based on a peak value of the signal integrated by the integrating circuit.

7. The position detecting device of claim 5, wherein the current-to-voltage converter is configured to amplify the combined current signal in addition to converting the combined current signal to an analog voltage signal.

8. A method for position detection used with a capacitive type position detecting device including: (a) a plurality of transmission electrodes arranged in a first direction; and (b) a plurality of reception electrodes arranged in a second direction that is substantially perpendicular to the first direction, the method comprising:

sequentially supplying signals having a waveform, which includes a determined time width (TIME_WIDTH) between a rising part and a falling part of the waveform, to the plurality of transmission electrodes wherein TIME_WIDTH is an integer (s≥2) multiple of a clock period CLK, such that said signals are sequentially supplied to the transmission electrodes Yn through Y{n+s} that are adjacent to each other per every CLK wherein (s+1) is a total number of the transmission electrodes to which the rising parts of said signals of TIME_WIDTH are sequentially supplied within TIME_WIDTH, and that the rising part of the waveform in said signal supplied to the transmission electrode Y{n+s} occurs at the same time as the falling part of the waveform in said signal supplied to the transmission electrode Yn and no rising and falling parts of two adjacent transmission electrodes coincide with each other;

selecting one of the reception electrodes with which said transmission electrodes Yn and Y{n+s} intersect to form two intersections, wherein in the selected one of the reception electrodes a first current is generated at a timing of the rising part of the waveform supplied to said transmission electrode Y{n+s} and a second current is generated at a timing of the falling part of the waveform supplied to said transmission electrode Yn, the first current and the second current being combined to form a combined current signal in the selected one of the reception electrodes, receiving the combined current signal from only the selected one of the reception electrode;

converting the received combined current signal to an analog voltage signal;

converting the analog voltage signal to a digital voltage signal; and detecting a position indicated by a position indicator on the position detecting device based on said digital voltage signal originating in the selected one of the reception electrodes, wherein, in a case where the position indicator is not present near the two intersections, the first current and the second current generated at the timings of the rising and falling parts of the waveform substantially cancel each other in the selected one of the reception electrodes, and in a case where the position indicator is present on or near one of the two intersections, the first current and the second current do not substantially cancel each other in the selected one of the reception electrodes.

9. The method of claim 8, wherein the signals supplied to the plurality of transmission electrodes are signals having a rectangular waveform.

10. The method of claim 9, wherein the step of sequentially supplying signals includes controlling input signals to a shift register having cells respectively corresponding to the plurality of transmission electrodes.

11. The method of claim 8, wherein the step of detecting a position includes receiving an input signal that indicates which one of the plurality of transmission electrodes is supplied with said signal having a waveform including the determined time width, to detect the position based on said input signal and signals received from the plurality of reception electrodes.

12. The method of claim 11, wherein the step of selecting one of the reception electrodes includes sequentially selecting the plurality of reception electrodes based on said input signal that indicates which one of the plurality of transmission electrodes is supplied with said signal.

13. The method of claim 8, wherein the step of detecting a position includes integrating the digital voltage signal originating in said selected one of the reception electrodes, to detect the position based on a peak value of the integrated signal.

14. The method of claim 13, wherein the step of converting the received combined current signal to an analog voltage includes amplifying the received combined current signal.

* * * * *

UNITED STATES PATENT AND TRADEMARK OFFICE
CERTIFICATE OF CORRECTION

| | | |
|---|---|---|
| PATENT NO. | : 8,581,857 B2 | Page 1 of 1 |
| APPLICATION NO. | : 12/534062 | |
| DATED | : November 12, 2013 | |
| INVENTOR(S) | : Masaki Matsubara | |

It is certified that error appears in the above-identified patent and that said Letters Patent is hereby corrected as shown below:

In the Claims

Column 17, Line 11:
"direction when TIME_WIDTH is an integer ($s \geq 2$) multiple" should read, --direction wherein TIME_WIDTH is an integer ($s \geq 2$) multiple--.

Column 17, Line 14:
"TIME_WIDTH to the first electrode Yn through Y {n+s}" should read, --TIME_WIDTH to the first electrodes, Yn through Y {n+s}--.

Signed and Sealed this
Fourteenth Day of January, 2014

Michelle K. Lee
*Deputy Director of the United States Patent and Trademark Office*